Jan. 14, 1941.  E. T. EVERSON  2,228,990
CARPENTER'S MEASURING INSTRUMENT
Filed May 9, 1940
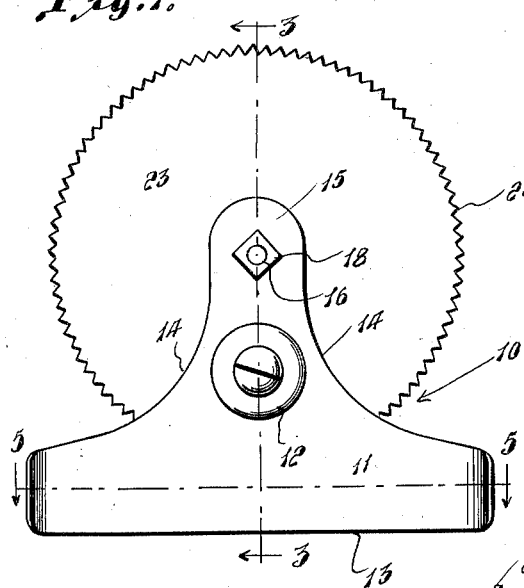
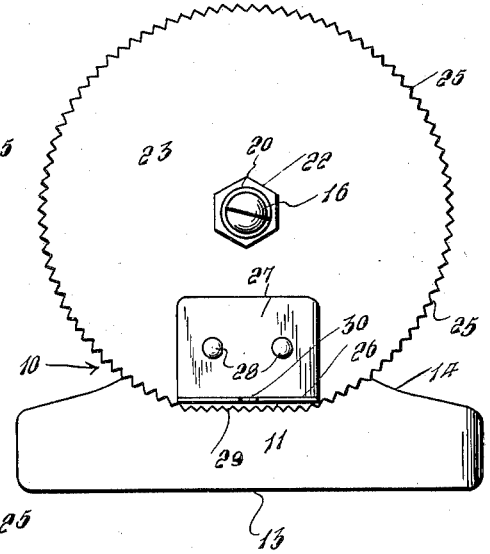
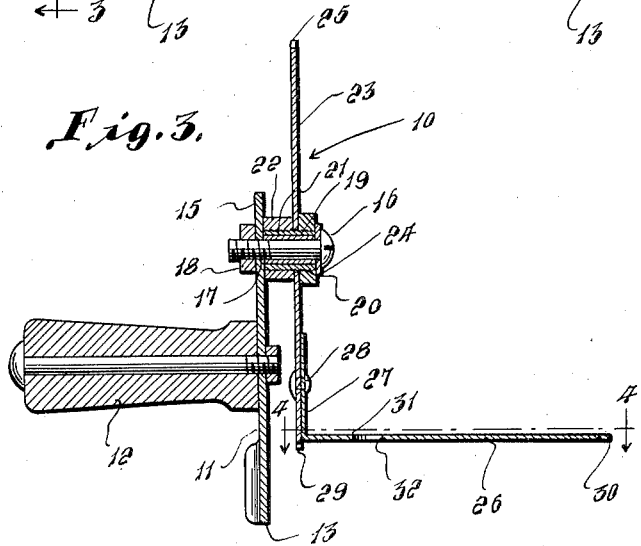
Inventor
Edwin T. Everson Patented Jan. 14, 1941

2,228,990

UNITED STATES PATENT OFFICE 2,228,990

CARPENTER'S MEASURING INSTRUMENT

Edwin T. Everson, Mondovi, Wis.

Application May 9, 1940, Serial No. 334,251

9 Claims. (Cl. 33—141)

This invention relates to an improved measuring instrument or device especially adapted for use in building construction for quickly and accurately measuring the spaces between joists, studdings, rafters and the like and for quickly and accurately marking off the spaces on sills for afterwards locating the joists, studdings and rafters when being applied.

More particularly, it is an aim of this invention to provide a toothed disk or wheel with proper circumference for measuring off the spaces between joists, girders and rafters by causing the wheel to be rolled along a sill or other supporting surfaces, said disk or wheel having a ruler for marking off the spaces on which the joists, studdings or rafters are to be applied, and a guide plate including a handle for supporting and operating the device and for causing it to be moved in a straight line along the sill to be so marked.

Other objects and advantages of the invention will hereinafter become more fully apparent from the following description of the drawing, which illustrates a preferred embodiment thereof, and wherein:

Figure 1 is a side elevational view looking toward the measuring device from the handle side thereof, Figure 2 is a similar view looking toward the device from the opposite side thereof, Figure 3 is a transverse vertical sectional view taken substantially along the plane of the line 3—3 of Figure 1, Figure 4 is a horizontal sectional view taken substantially along the plane of the line 4—4 of Figure 3, and Figure 5 is a horizontal sectional view taken substantially along the plane of the line 5—5 of Figure 1.

Referring more particularly to the drawing, wherein like reference characters designate like or corresponding parts throughout the different views, 10 designates generally the measuring device or instrument and including generally a perpendicular guide plate 11 provided with a handle 12 which projects outwardly from one side thereof intermediate of its upper and lower edges. The guide plate 11 is relatively wide at its lower end 13 and is provided with arcuately shaped side edges 14 forming the relatively narrow upper end 15. The wide, lower portion of the guide plate 11 is provided with corresponding outwardly flared ends, for a purpose which will hereinafter be described.

A bolt 16 extends through an opening 17 in the upper end 15 and is attached to the guide plate 11 by means of a nut 18, with the shank and head portion of the bolt projecting outwardly of the plate 11 from the opposite side thereof, to the handle 12. A sleeve or bushing 19 is mounted on the shank of the bolt 16 between the plate 11 and a washer 20 which is carried by the shank of the bolt 16 and disposed against the inner side of its head. A sleeve or bearing 21 is turnably mounted on the bushing 19 and is provided with externally threaded ends to receive the clamping nuts 22. A disk or wheel 23 is provided with a central opening 24 to receive the bearing 21 on which it is mounted. The disk or wheel 23 is clamped between the clamping nuts 22 and thereby is keyed to the bearing 21 to rotate therewith.

As best seen in Figure 3, the radius of disk or wheel 23 is substantially less than the height of the plate 11 so that the lower portion of the periphery thereof is disposed substantially above the lower edge 13 of the guide plate 11. The disk 23 is provided with a toothed or serrated periphery 25.

A tongue or ruler 26 is provided with a flange 27 at one end thereof which is disposed at a right angle thereto and which is secured to the outer side of the disk 23 by means of the fastenings 28. The tongue or ruler 26 is disposed substantially at a right angle to the plane of the disk 23 and projects outwardly therefrom adjacent a portion of its periphery, which portion, designated 29, as best seen in Figure 2, forms a chord of the circle defined by the disk 23, and which is therefore in substantially a straight line and parallel to the plane of the tongue or ruler 26, which is disposed thereabove and adjacent thereto. The ruler or tongue 26, at its outer free end, is provided with a notch 30 and adjacent its secured end with an opening 31 having an elongated tapered portion which tapers to a point at 32. The center of the notch 30 and the opening 31 and the point 32 of the opening 31 are all alined and disposed in alinement with the longitudinal center line of the tongue or ruler 26.

From the foregoing it will be obvious that the measuring instrument 10 provides a device of simple construction capable of quickly and accurately measuring distances equal to the circumference of the disk 23, which functions as a traversing disk or wheel. The circumference of the disk or wheel 23 is equal to the distance or space between the joists, studdings or girders and this circumference may obviously be varied depending upon the variation of such spacing.

To mark off a sill, not shown, on which joists are to be secured, the disk 23 is positioned on a sill with the portion 29 of its periphery upon the space where the first joist is to be positioned. The ruler or tongue 26 is of a width equal to the width of a standard joist, so that its longitudinal edges may be used as ruling edges for marking the upper surface of the sill to indicate the position of one end of the joist. With the lower wide portion of the gauge plate 11 abutting against a side of the sill, the instrument 10 is held by the handle 12 and moved along the sill to cause disk 23 to revolve a full revolution at which time the portion 29 will again come into flush contact with the sill, indicating that a full revolution has been made, when the longitudinal edges of tongue 26 are again used to mark a space for another joist, and so on, in like manner, until the entire sill has been marked off. The opposite sill is then similarly marked, beginning at a corresponding point, for the opposite ends of the joists. The serrated or toothed periphery 25 prevents the disk or wheel 23 from slipping to thereby insure uniformity between the various measurements. The outwardly flared ends of the lower portion of the guide plate 11, which are curved away from the disk 23, are provided to prevent the ends of the guide plate 11 from catching on rough portions or other obstructions on the sill while the instrument is moving therealong. The point 32 of the opening 31 and the bed or center of the notch 30 is adapted to be employed to aline the longitudinal center of the tongue or ruler 26 with a side of an outside corner of a building when the instrument 10 is used for measuring the spaces between studdings to insure proper spacing of the studdings so that later outside sheathing may be readily attached thereto. The instrument 10 can also be readily used for spacing studdings on circular construction work as well as for spacing girders and joists between arches on barn frames, and other buildings having arched trusses.

Various modifications and changes in the construction and arrangement of the parts forming the invention are contemplated and may obviously be resorted to, as only a preferred embodiment of the invention has been disclosed.

I claim as my invention:

1. A measuring instrument comprising a guide plate having a handle projecting from one side thereof, a shaft mounted in said guide plate, a disk journaled on said shaft and disposed on the opposite side of said guide plate and in spaced apart relationship thereto, and a tongue having a flange at one end thereof fixed to said disk, said tongue projecting outwardly from the disk, adjacent a portion of the periphery thereof, and away from the guide.

2. A measure as in claim 1, said tongue being disposed substantially at a right angle to the plane of the disk, said tongue being provided with substantially straight longitudinal edges forming a ruler.

3. A measure as in claim 1, said tongue being disposed substantially at a right angle to the plane of the disk, said tongue being provided with substantially straight longitudinal edges forming a ruler, said tongue having a centrally disposed notch at its free end and a centrally disposed elongated opening, adjacent its secured end for positioning the measure.

4. A measuring device as in claim 1, said tongue being disposed substantially at a right angle to the plane of the disk and having a straight edge to form a ruler, and said disk having a serrated periphery, including a straight portion, disposed substantially parallel to the plane of said tongue and directly therebeneath.

5. A measuring device for spacing studding, joists and rafters, comprising a guide plate having a handle projecting from one side thereof and a bearing projecting from the opposite side of said plate and above the handle, a disk journaled on said bearing and disposed in spaced apart relationship to the guide plate, said guide plate extending below the disk, said disk having a toothed periphery, and a ruler having a flange at one end thereof secured to the disk, said ruler projecting outwardly from the outer side of the disk and adjacent a portion of its periphery and being disposed substantially at a right angle to the plane thereof.

6. A measuring device as in claim 5, said ruler having centrally disposed longitudinally spaced positioning means, and the toothed periphery of said disk, including a straight portion, disposed beneath and contiguous with the ruler.

7. A measuring device as in claim 5, said guide plate having outwardly flared end portions, extending away from said disk, for readily passing obstructions on a sill as the device is moved therealong.

8. A measuring device comprising a guide, a traversing wheel rotatably connected to the guide, and the periphery of the wheel being provided with a flattened portion forming a stop.

9. A measuring instrument comprising a guide, a traversing wheel mounted on one side thereof and rotatably connected thereto, and a ruler secured to said wheel and projecting outwardly therefrom from the outer side of and adjacent the periphery of the wheel.

EDWIN T. EVERSON.